United States Patent [19]

Shimizu

[11] 4,201,977
[45] May 6, 1980

[54] DATA PROCESSING AND STORAGE SYSTEM USING FILTERING AND SAMPLING TECHNIQUES

[75] Inventor: Toshiyuki Shimizu, Tokyo, Japan

[73] Assignee: Hajime Industries, Ltd., Japan

[21] Appl. No.: 891,913

[22] Filed: Mar. 30, 1978

Related U.S. Application Data

[63] Continuation-in-part of Ser. No. 721,765, Sep. 9, 1976, abandoned.

[30] Foreign Application Priority Data

Sep. 18, 1975 [JP] Japan ................................. 50-113358

[51] Int. Cl.² .............................................. G06K 9/02
[52] U.S. Cl. ............................................ 340/146.3 H
[58] Field of Search ................. 340/146.3 H, 146.3 Q, 340/146.3 R, 146.3 C; 358/107, 106, 160

[56] References Cited

U.S. PATENT DOCUMENTS

| | | | |
|---|---|---|---|
| 3,114,132 | 12/1963 | Trimble et al. | 340/146.3 C |
| 3,548,374 | 12/1970 | Vaccaro | 340/146.3 C |
| 3,605,092 | 9/1971 | Richard | 340/146.3 C |
| 3,818,127 | 6/1974 | Walter | 358/106 |
| 3,947,833 | 3/1976 | Eckstein | 358/107 |

Primary Examiner—Joseph M. Thesz
Attorney, Agent, or Firm—Hill, Van Santen, Steadman, Chiara & Simpson

[57] ABSTRACT

An information signal processing system for use with a pattern recognition system which includes a converting device for converting information signals of an object or pattern to be recognized into electric signals including a sampling circuit for sampling the electric signal from the converting device, a circuit receiving the electric signal and producing a signal to be supplied to the sampling circuit to determine the sampling time, and a computer receiving the output signals from said sampling circuit and sequentially comparing them with reference signals stored therein. In this case, the information signal processing system includes a circuit which receives the electric signal from the converting device and produces a signal which approximates the electric signal. This approximated signal is supplied to the sampling circuit.

7 Claims, 11 Drawing Figures

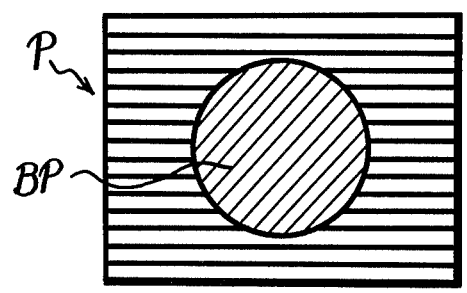
Fig. 2
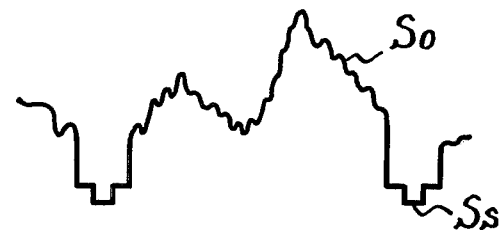
Fig. 3 A
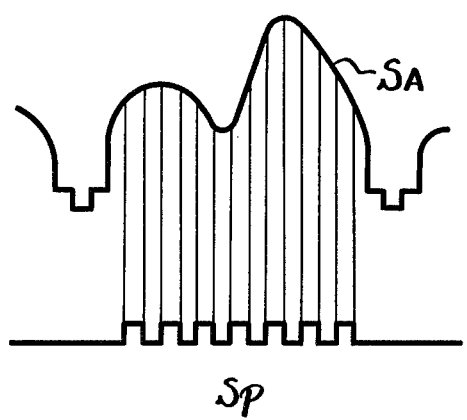
Fig. 3 B
Fig. 3 C

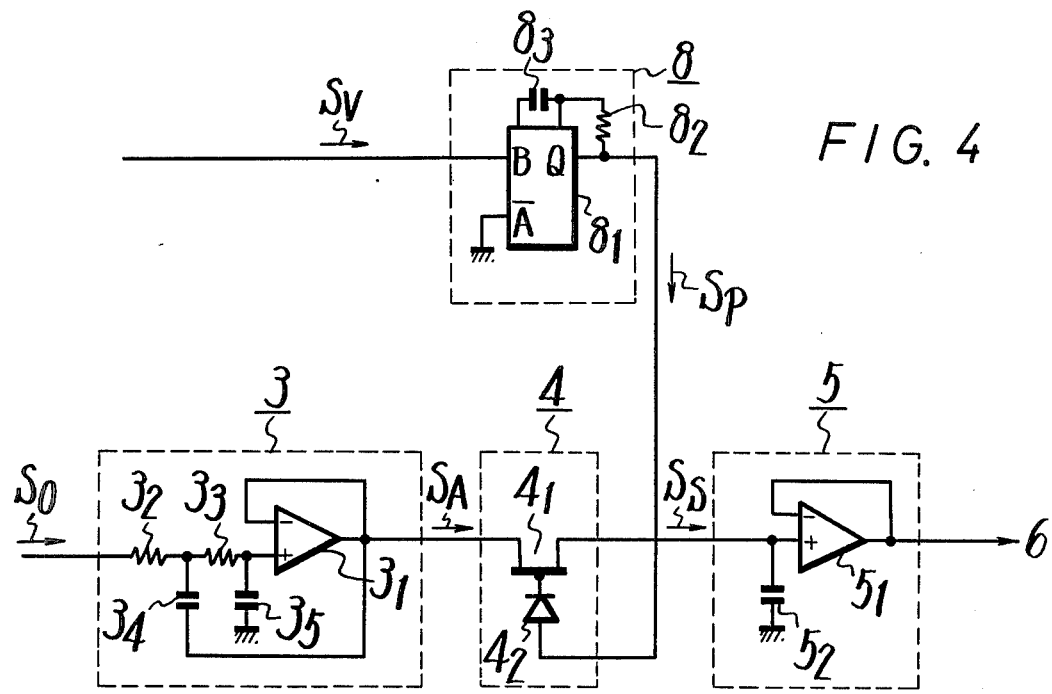
FIG. 4
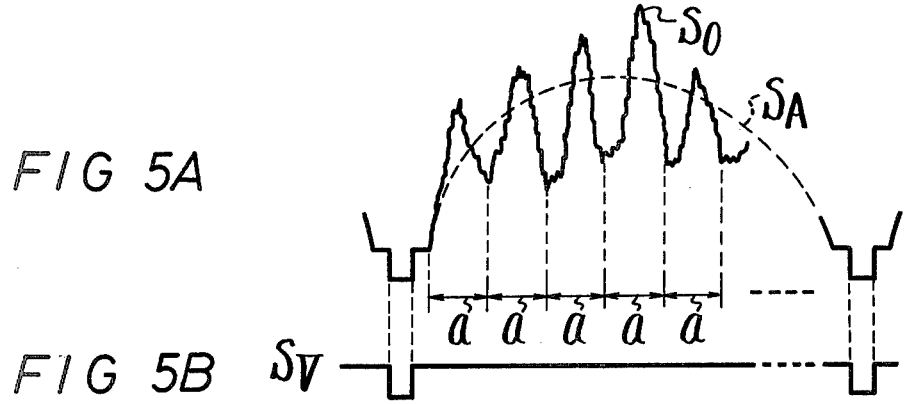
FIG 5A
FIG 5B $S_V$
FIG 5C $S_P$
FIG 5D $S_S$
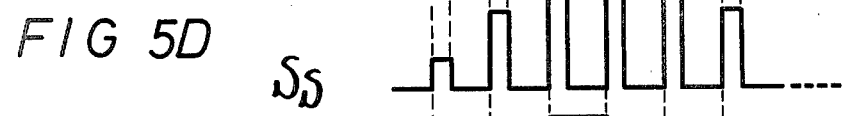
FIG 5E $S_H$

DATA PROCESSING AND STORAGE SYSTEM USING FILTERING AND SAMPLING TECHNIQUES

CROSS-REFERENCES TO RELATED APPLICATIONS

This application is a continuation-in-part of application Ser. No. 721,765 filed Sept. 9, 1976, now abandoned.

BACKGROUND OF THE INVENTION

1. Field of the Invention

This invention relates generally to an information signal processing system and is directed more particularly to an information signal processing system suitable for use with pattern recognition systems.

2. Description of the Prior Art

With prior art pattern recognition systems, a picture, pattern or the like is divided into, for example, 120 horizontal scanning lines by a television camera and then provided as video signals. Then, the video signals are converted into a sampled signal each of which has 120 digital values at every one horizontal scanning line, and accordingly a single picture frame has 14,400 digital values. Further, by adaptation of stroke method or pattern matching method or the like to this sampled signal, the features of the pattern, characters or the like of a single picture frame are extracted to establish the recognition thereof.

As a result, under the conventional systems, the quantities of the digital values for a single picture frame are extremely large, so that the construction of the prior art pattern recognition systems is complicated and has a disadvantage because a long processing time is inevitable.

Accordingly, in order to solve such a disadvantage, it is desirable to minimize the sampling frequency which equals the number of digital values of one picture. However, in doing so, the resolution ability of patterns, characters, etc. within one picture, is reduced and is undesirable.

Further, as another method of solution, the adaption of band compression methods may be considered, but the reduction ratio thereof is at most about 1/10 and hence the methods are not remarkably practical.

OBJECTS AND SUMMARY OF THE INVENTION

Accordingly, it is an object of the present invention to provide a novel information signal processing system suitable for use with a pattern recognition system.

It is another object of the invention to provide an information signal processing system which not only simplifies the construction of a pattern recognition system, but also at the same time, reduces the processing time of the pattern recognition.

According to an aspect of the present invention there is provided an information signal processing system for use with a pattern recognition system which includes a converting device converting an information signal of an object or pattern to be recognized into an electric signal, a sampling circuit sampling the electric signal from the converting device, a circuit receiving the electric signal and producing a signal to be supplied to the sampling circuit to determine the sampling time thereof, and a computer receiving the output signals from said sampling circuit and sequentially comparing the same with reference signals stored therein, in which the information signal processing system includes a circuit which receives the electric signal from the converting device and produces a signal which approximates the electric signal and the approximate signal is supplied to the sampling circuit.

The additional and other objects, features and advantages of the invention will become apparent from the following description taken in conjunction with the accompanying drawings.

BRIEF DESCRIPTION OF THE DRAWINGS

FIG. 2 illustrates an example of the pattern which is to be recognized by the system shown in FIG. 1;

FIGS. 3A–3C show waveform diagrams used for the explanation of the system shown in FIG. 1;

FIG. 4 is a schematic view illustrating certain of the components of FIG. 1; and FIGS. 5A–5E illustrate waveforms in the invention.

DESCRIPTION OF THE PREFERRED EMBODIMENT

Figure 1:
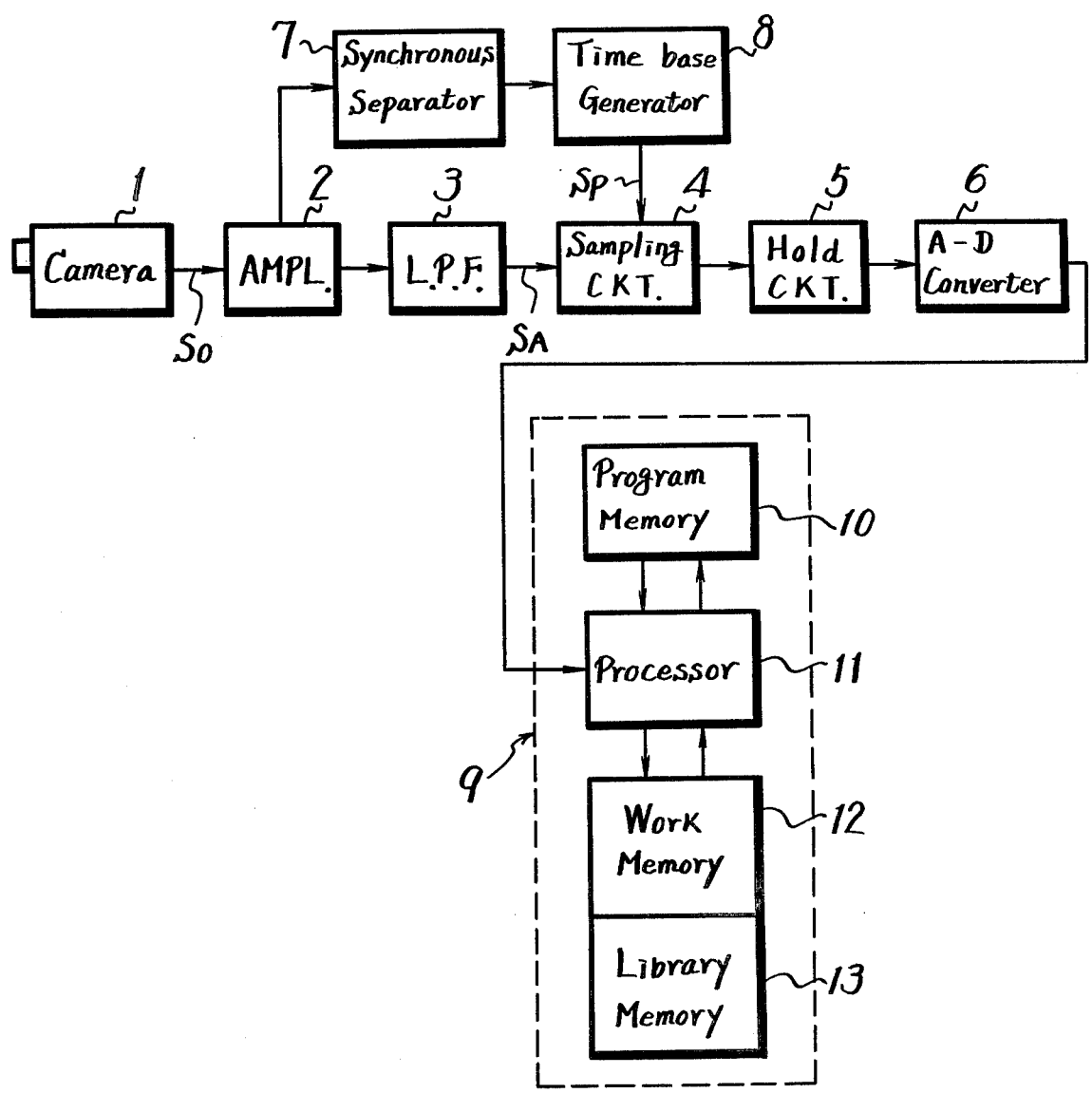
FIG. 1 shows a block diagram showing a pattern recognition system (data recognition system) which adopts an example of the information signal processing system according to this invention.

An example of the present invention will be hereinbelow described with reference to the drawings.

FIG. 1 shows the pattern recognition system in which an example of the information signal processing system according to the invention is adapted.

FIG. 1 illustrates an information to information signal converter 1 such as a television camera which converts an information signal of a picture, pattern or the like to be recognized into, for example, a video signal as an information signal. From television camera 1, a picture P which has, for example, a black circle pattern BP, as shown in FIG. 2, is resolved into, for example, 120 horizontal scanning lines and is then formed into video signals. An original video signal $S_O$ as obtained from this television camera 1 is a composite video signal which contains synchronous signals $S_S$ as shown in FIG. 3A. This original video signal $S_O$ from the television camera 1 passes through an amplifier 2 and is then fed to an envelope shaping circuit such as a low pass filter 3 which eliminates signal components higher than a certain frequency (for instance 2000 cycles per second to 7000 cycles per second) from the original video signal $S_O$ and then, as shown in FIG. 3B, produces an approximate video signal $S_A$ which consists of the envelope of the video signal $S_O$ shown in FIG. 3A. This approximate video signal $S_A$ is supplied to a sampling circuit 4 and then sampled thereby. The video signal as produced by the television camera 1 and passed through the amplifier 2 is fed to a synchronous separation circuit 7 also which then separates the horizontal and vertically synchronizing signals from the video signal $S_O$. The synchronizing signals from the circuit 7 are fed to a time base generator 8 which then generates sampling pulses $S_P$ of, for example, seven which are sufficient to recognize the picture, pattern or the like at every horizontal period as shown on FIG. 3C. The sampling pulses $S_P$ are fed to the sampling circuit 4 to determine the sampling time within one sampling period. The number of sampling pulses $S_P$ at one horizontal period or one sampling period need not be limited to seven but can be changed in accordance with the complexity of the pattern to be recognized. The output signal from the sampling circuit 4 is fed through a sampling hold circuit 5 to an A-D converter 6 which produces a digital-sampled signal of the approximated signal $S_A$. The digital-sampled signal from the A-D converter 6 is supplied to an electronic computer 9 which can be of a well known type and which sequentially compares the output signals from the A-D converter 6 with reference signals previously stored therein.

One example of the computer 9 includes a ROM 10 such as a programable memory which stores a predetermined program, a processor 11, a work member 12 and a library memory 13 which form a RAM and the library memory stores reference signals.

When the output signal from the A-D converter 6 is supplied to the computer 9, the processor 11 compares the signal from the A-D converter 6 with the reference signal previously stored in the library memory 13 under the working area of the working memory 12 in accordance with the program memorized in the program memory 10 to detect whether both the signals are coincident or not. The above comparison is sequentially achieved for each signal supplied from the A-D converter 6 to the computer 9 in one horizontal period to carry out the pattern recognition.

In this case, as well known, the library memory 13 includes a number of library memory parts which previously memorize reference signals or sampled signals of approximated signals to video signals of various pictures, patterns and so on, so that various pictures, patterns and so on can be recognized, that is, the shapes, size and the like thereof can be recognized.

In the above example, a picture or the like is exemplified as an object to be recognized, but it will be easily understood that other kinds of objects such as voices can be also recognized similarly by using, for example, a microphone in place of the television camera 1 and replacing the memory stored in the library memory 13 with signals corresponding to reference signals thereof. In such case, identification whether such voice is an animal cry, a bell ringing or a drum beating, can be accomplished.

Further, it is not necessary that the passing preventing frequency of the low pass filter 3 and the sampling frequency of the sampling circuit 4 be limited to the above specific examples but they may be freely selected according to the invention.

It is also possible in the case of scanning a pattern to produce video signals such that the scanned locus form concentric circles, volutions, stars, or any other possible shape.

Since the information signal processing system of this invention as above described is formed mainly by the low pass filter, which is supplied with the original information signal and which eliminates signal content of higher frequency than a certain predetermined frequency, and of the sampling circuit which is supplied with the output of the low pass filter and the sampled signal which approximates the original information signal is obtained from the sampling circuit, that is, the signal to be sampled is an envelope signal, it is possible to reduce the number of samplings required and to simplify the construction of a pattern recognition system while at the same time, the pattern recognition processing time can be substantially shortened.

This invention may be applied to recognition of pictures, patterns and so on (voices) as well as inspection or supervision systems, etc., where precision recognition of informations is not required.

FIG. 4 illustrates one practical example of the low pass filter 3 and other components. The low pass filter 3 consists of an operational amplifier $3_1$ a series connection of resistors $3_2$ and $3_3$ connected to the +input terminal of amplifier $3_1$, a capacitor $3_4$ connected between the output terminal of amplifier $3_1$ and the junction point between resistor $3_2$ and $3_3$. A capacitor $3_5$ is connected between the +input terminal of amplifier $3_1$ and ground. In this case, the output terminal and-input terminal of operational amplifier $3_1$ are connected directly together. Thus, this low pass filter 3 is a form of the well known Butterworth low pass filter.

In general, the cut-off frequency of the low pass filter is determined in accordance with the number of horizontal scanning lines and scanning time of the camera 1. But, in the case of the present invention where a commercial television camera 1 is used, the cut-off frequency of low pass filter 3 is selected to be 2 $KH_Z$ to 7 $KH_Z$. The cut-off frequency of low pass filter shown in FIG. 4 is set at about 2 $KH_Z$ by selecting the resistance value of resistors $3_2$ and $3_3$ as 80,000 ohms, and the capacitors $3_4$ and $3_5$ are selected to have values of 1400 $pF$ and 680 $pF$, respectively.

When the original video signal $S_O$ passes through amplifier 2 from camera 1, as shown in FIG. 5A by solid line, and is fed to the low pass filter 3, the video signal $S_O$ is converted to the envelope approximate video signal $S_A$ as shown in FIG. 5A by the dotted line due to the fact that the cut-off frequency of low pass filter 3 is selected to be as low as described above. In FIG. 5A, a designates one horizontal scanning period. Since the cut-off frequency of low pass filter 3 is selected to be low in frequency, the variations of signal $S_A$ during the period a will be smooth as shown.

If a low pass filter, which has a cut-off frequency that is selected to be high so as to eliminate noise, is used in place of the low pass filter 3 of this invention, the signal $S_O$ which passes through such filter, will almost not be changed in waveform by such low pass filter. Therefore, if the signal passed through such low pass filter having a high cut-off frequency is sampled by a small number of samplings at arbitrary times as in this invention, the troughs and peaks of the signal passed through the low pass filter will be sampled depending upon the timing of sampling. As a result, it is required to much greatly increase the number of samplings so as to know the information in the signal $S_A$ passed through such low pass filter to detect the signal $S_O$ and hence recognize an object. That is, the employment of such low pass filter having a high cut-off frequency can not achieve the object of the present invention.

In fact, however, in this invention the cut-off frequency of the low pass filter 3 is selected to be low such as $KH_Z$ so that the original video signal $S_O$ is converted to the envelope or smooth signal $S_A$, as shown in FIG. 5A, by the low pass filter 3. Thus, even if this signal $S_A$ is sampled at arbitrary times and with a small number of samplings, the necessary data which represents the intelligence in signal $S_A$ (hence, the distinguishing features of the object to be recognized) can be obtained. In other words, the feature of the whole waveform of signal $S_A$ (or $S_O$) or the feature of the entire object to be recognized can be determined with the small amount of data.

In FIG. 4, the output signal $S_A$ from low pass filter 3 is fed to sampling circuit 4 which consists of, for example, an FET $4_1$ and a diode $4_2$ connected as shown. The signal $S_A$ is fed to the source side of FET $4_1$. The time base generator 8 is formed of, for example, a multivibrator $8_1$ and a time constant circuit consisting of a resistor $8_2$ and a capacitor $8_3$. The vertical synchronizing signal $S_V$ shown in FIG. 5B from the synchronous separator 7 is fed to time base generator 8 which then produces the sampling signal $S_P$ shown in FIG. 5C whose period is determined by the resistor $8_2$ and capacitor $8_3$. This sampling signal $S_P$ is fed to the sampling circuit 4 i.e. to the gate of FET $4_1$ through diode $4_2$. When the sampling signal $S_P$ is applied to the gate of FET $4_1$, the signal applied to the source side of FET $4_1$ is delivered to its drain side. That is, when the sampling signal $S_p$ is fed to the gate of FET $4_1$ from the drain side of FET $4_1$ there is obtained the sampled signal $S_S$ shown in FIG. 5D, which is then fed to the hold circuit 5. This hold circuit 5 is formed of an operational amplifier $5_1$ and a capacitor $5_2$ which is connected between the +input terminal of amplifier $5_1$ and ground. In this example, the output terminal of amplifier $5_1$ is connected directly to its -input terminal. When the sampled signal $S_S$ is fed to operational amplifier $5_1$ i.e. its +input terminal, this amplifier $5_1$ produces at its output terminal the signal $S_H$ shown in FIG. 5E.

The above description is given on one preferred embodiment of the present invention, but it will be apparent that many modifications and variations could be effected by one skilled in the art without departing from the spirits or scope of the novel concepts of the invention. Therefore, the scope of the invention should be determined by the appended claims only.

I claim as my invention:

1. An information signal processing system for use with a pattern recognition system which has means (1) for converting an information signal of an object to be recognized into an electrical signal ($S_O$), means (7) for receiving the electrical signal from said converting means and producing horizontal and vertical synchronizing signals from the electrical signal and producing a sampling signal ($S_P$), means (4) for sampling said electrical signal from said converting means controlled by said sampling signal and means (9) for sequentially comparing output signals from said sampling means with reference signals, said information signal processing system being characterized in that said sampling signal producing means comprises means (8) receiving the vertical synchronizing. signal ($S_V$) and producing a plurality of sampling signals ($S_P$) in one period between adjacent vertical synchronizing signals, and filtering means (3) provided which receives the electrical signal ($S_O$) from said converting means and produces an envelope signal ($S_A$) which is approximately equal to said electrical signal ($S_O$) from said converting means and supplies its output to said means (4) for sampling, the filtering characteristic of said filtering means (3) being selected so as to smooth said electrical signal ($S_A$) from said converting means during at least more than one horizontal scanning period, said signal ($S_A$) from said filtering means being supplied to said sampling means, and said sampling signals ($S_p$) from said sampling signal producing means (8) being also supplied to said sampling means to determine its sampling time within one period.

2. An information signal processing system as claimed in claim 1, in which said means for receiving the electrical signal and producing a signal approximated to said electrical signal is a low pass filter.

3. An information signal processing system as claimed in claim 1, in which said approximated signal is an envelope signal of said electrical signal.

4. An information signal processing system as claimed in claim 1, in which said comparing means is an electronic computer.

5. An information signal processing system as claimed in claim 4, in which said computer includes a program memory storing a predetermined program, a processor, a work memory and a library memory storing reference signals.

6. An information signal processing system as claimed in claim 5, in which said library memory includes a number of library memory elements which store different reference signals with one another.

7. An information signal processing system as in claim 1 wherein the filtering characteristics of said means for receiving the electrical signal from said converting means being that of a low pass filter with a high frequency cut-off of 7000 cycles per second or less.

* * * * *